May 26, 1925.
G. L. SMITH
BRAKE MECHANISM
Filed Jan. 17, 1924
1,539,780
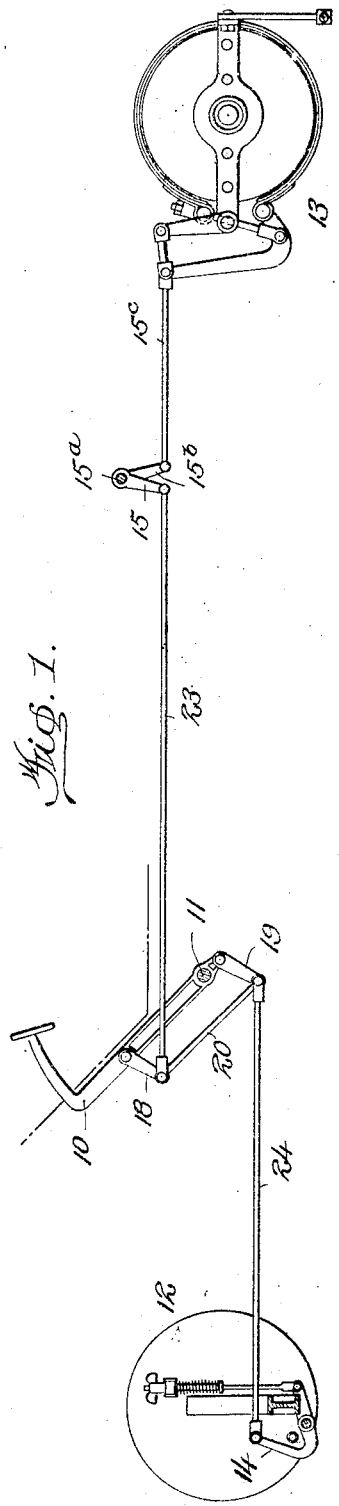
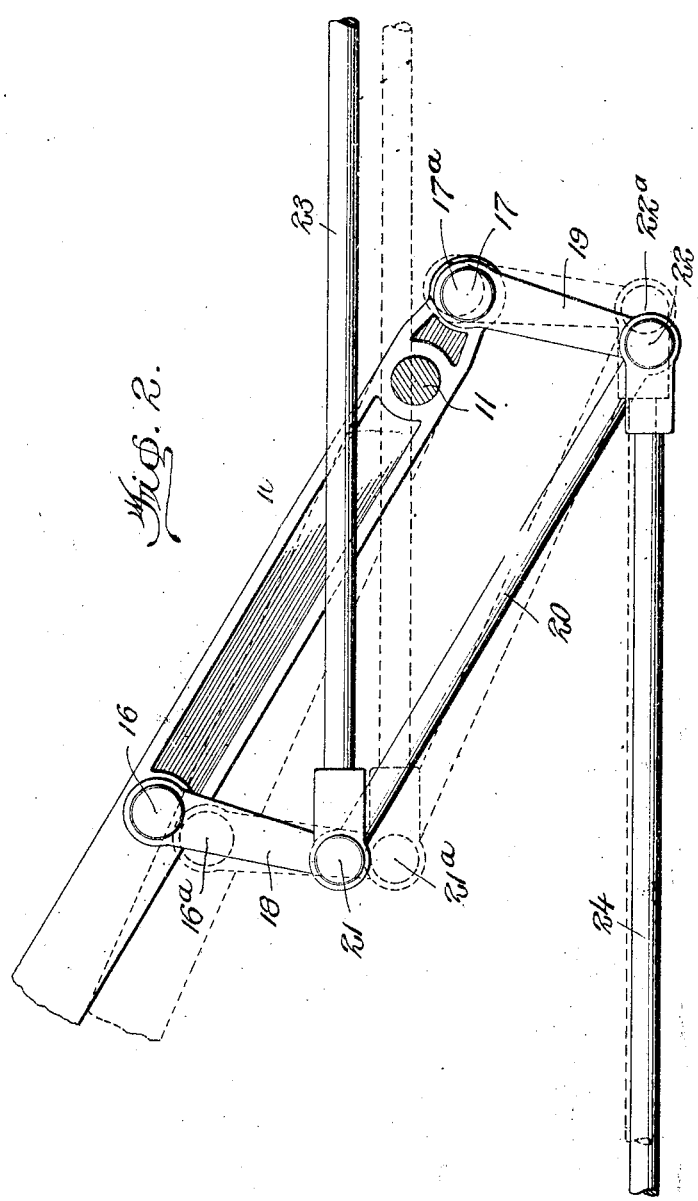
Inventor
George L. Smith,
By Bright & Bailey
Attorneys Patented May 26, 1925.

1,539,780

UNITED STATES PATENT OFFICE.

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

BRAKE MECHANISM.

Application filed January 17, 1924. Serial No. 686,906.

*To all whom it may concern:*

Be it known that I, GEORGE L. SMITH, a citizen of the United States, and resident of Washington, in the District of Columbia, have invented certain new and useful Improvements in Brake Mechanisms, of which the following is a specification.

My invention relates to brake mechanisms for vehicles, and my purpose is to provide a simple means which may easily be applied to conventional designs of vehicle brake mechanisms, whereby braking pressures applied by a lever common to front and rear brake systems are distributed between such systems.

With the foregoing and other purposes in view, my invention consists in the novel features of construction, combination and arrangement of parts as will be hereinafter more fully described, illustrated in the accompanying drawings, and defined in the appended claims.

In the drawings wherein like characters of reference denote corresponding parts in the separate views Figure 1 is an elevation of a means embodying the novel and essential features of my invention as applied to the foot brake pedal of an automobile for distributing the braking forces applied by said brake pedal to front and rear brake systems; and Figure 2, an enlarged view of a fragment of Figure 1, showing in full lines a position of the foot brake pedal and my force distributing means when the brakes have been initially applied, and in dotted lines, a position of the brake pedal and said means after the braking forces have been fully applied and distributed.

Referring now to the drawings in detail, 10 designates a brake lever which may be of any suitable design and operated in any suitable or desired manner, the same being illustrated in this instance as a foot brake pedal having pivotal connection as at 11, with a fixed support such as a part of the chassis of an automobile, and having connections with a front brake system partially indicated at 12 and a rear brake system partially indicated at 13 whereby the one lever is adapted for operating both brake systems, it being understood, of course, that while I have shown only one brake of the front system and one brake of the rear system, each system includes two brakes with operative connections therebetween, so that the one brake lever aforementioned is adapted for operating both brakes of each brake system simultaneously. The particular design of the brake systems to be operated is, of course, immaterial, but for convenience I have illustrated, in part, a front brake system constructed and adapted to operate in accordance with the disclosure in my application 660,190, and, in part, a rear brake system as covered by my Patent 1,440,842. A detailed description of the front and rear brake systems therefore is unnecessary other than to point out that the front system includes a lever arm 14 upon rearward movement of which the front brakes are applied, and that the rear system includes a lever arm 15 upon forward movement of which the rear brakes are applied through connections 15ª, 15ᵇ and 15ᶜ.

Pivoted to the brake lever 10 at the points 16 and 17, respectively, is a pair of lever arms 18 and 19 joined at their free ends by a link 20, the length of which, between its points of pivotal connection 21, 22, respectively, with the lever arms is equal to the distance between the pivots 16, 17, so that said lever arms in conjunction with the brake pedal and the link 20 form a parallelogram.

The actuating rod 23 for the rear brake system is pivoted at one end to the lever 15 and at its other end to the aforesaid parallelogram at the pivot 21, while the actuating rod 24 for the front brake system is pivoted at one end to the lever 14 and at its other end to the parallelogram at the pivot 22.

The operation of the mechanism is as follows: The brake lever 10 is pressed downward about its pivot 11 from the position of Figure 1, for instance, to the full line position of Figure 2, which results, of course, in a forward movement of the actuating rod 23 and a rearward movement of the actuating rod 24, thereby causing the lever arms 14, 15 to be swung to effect an application of the brakes. If the amount of movement of the rods 23 and 24 necessary to effect an application of the front and rear brakes is equal to the amount of forward and backward movements of the pivots 21, 22, respectively, at the end of a predetermined amount of depression of the brake lever about its pivot 11, then equal braking pressures will be transmited from the brake lever through the parallelogram without the elements of the latter changing their relative positions. On the other hand, assuming that the relative adjustment of the front and rear brake systems is such that a lesser amount of movement of rod 23 is required to apply the rear brakes than the amount of movement of rod 24 to apply the front brakes, it is apparent that upon a predetermined amount of depression of the brake lever 10, the rod 23 will be moved to apply the rear brakes before the front brakes are applied. It follows, therefore, that since an application of the rear brakes restricts further forward movement of the pivot 21, continued depression of the brake lever 10 will result in a partial collapse of the parallelogram to the position 16ª—21ª—22ª—17ª with consequent rearward movement of the pivot 22, which collapse will continue until the front brakes become applied. As both front and rear brakes begin to tighten a compressive force will be built up in link 20 which will produce a forward tension on the actuating rod 23 and a rearward tension on the actuating rod 24. It is evident that the tension on the actuating rod 23 will be equal to the horizontal component of the compression in the lever arm 18 plus that in the link 20 and that the tension on the actuating rod 24 will be equal to the horizontal component of the tension in the lever arm 19 plus that in the link 20. As the lever arms 18 and 19 are parallel and resist equally the reactions on them, it follows that the tensions on the two actuating rods must be equal, each being composed of two equal forces plus a force common to both acting through the link 20. On the other hand, if the relative adjustment of the front and rear brake systems is such that a lesser amount of movement of rod 24 is required to apply the front brakes than the amount of movement of rod 23 to apply the rear brakes, the operation of effecting equalization of brake pressures will be just the reverse. While the relative arrangement of the brakes, the brake lever and the force distributing means is such that the rods 23, 24 do not always remain parallel (a condition necessary to perfect equalization) the rods 23, 24 are relatively long and their angular movement so slight that the equalization is sufficiently accurate for all practical purposes.

I claim:—

1. The combination of a pair of members for respectively transmitting forces against separate resistances, a lever for imparting forces to said members for transmission against said resistances, and a swinging arm and link system on the lever operating to distribute said forces through the members against said resistances.

2. In an automobile front and rear wheel brake system, the combination of a pair of members for respectively transmitting forces to the front and rear brakes of the system, a lever for imparting forces to the members for transmission to the front and rear brakes respectively, and a swinging arm and link system on the lever operating to distribute said forces through the members to said brakes.

3. The combination of a pair of members for respectively transmitting forces against separate resistances, a lever for imparting forces to said members for transmission against said resistances, and a swinging arm and link system on the lever operating to equally and simultaneously distribute said forces through the members against said resistances.

4. The combination of a pair of members for respectively transmitting forces against separate resistances, a lever for imparting forces to said members for transmission against said resistances, a pair of arms pivoted to said lever and having said members respectively pivoted thereto, and means between said arms cooperating with the latter to distribute said forces through the members against said resistances.

5. In an automobile front and rear wheel brake system, the combination of a pair of members for respectively transmitting forces to the front and rear brakes of the system, a lever for imparting forces to the members for transmission to the front and rear brakes respectively, a pair of arms pivoted to said lever and having said members respectively pivoted thereto, and means between said arms cooperating with the latter to distribute said forces through the members to said brakes.

6. The combination of a pair of members for respectively transmitting force against separate resistances, a lever for imparting forces to said members for transmission against said resistances, a pair of arms pivoted to said lever and having said members respectively pivoted thereto, and a link connecting said arms and cooperating therewith to distribute said forces through the members against said resistances.

In testimony whereof I hereunto affix my signature.

GEORGE L. SMITH.